United States Patent [19]
Yamamoto

[11] Patent Number: 5,479,442
[45] Date of Patent: Dec. 26, 1995

[54] SPECTRUM SPREAD RECEIVER AND SPECTRUM SPREAD TRANSMITTER-RECEIVER INCLUDING SAME

[75] Inventor: Michio Yamamoto, Mobara, Japan

[73] Assignee: Futaba Denshi Kogyo K.K., Mobara, Japan

[21] Appl. No.: 106,653

[22] Filed: Aug. 16, 1993

[30] Foreign Application Priority Data

Aug. 31, 1992 [JP] Japan .................................. 4-253500

[51] Int. Cl.$^6$ ........................... H04B 1/707; H04B 1/69
[52] U.S. Cl. ............................ 375/206; 375/200; 380/34
[58] Field of Search ............................ 375/1, 200–210; 380/34; 455/336; 329/367; 340/539

[56] References Cited

U.S. PATENT DOCUMENTS

| | | | |
|---|---|---|---|
| Re. 34,004 | 7/1992 | Rogoff et al. | 375/1 X |
| 2,768,372 | 10/1956 | Green | 375/1 X |
| 3,478,268 | 11/1969 | Coviello | 375/1 |
| 3,590,380 | 6/1971 | Zegers et al. | 375/1 X |
| 3,605,018 | 9/1971 | Coviello | 375/1 |
| 3,614,316 | 10/1971 | Andrews, Jr. et al. | 375/1 X |
| 5,307,053 | 4/1994 | Wills et al. | 340/539 X |

OTHER PUBLICATIONS

Pender et al, *Electrical Engineers' Handbook;* John Wiley & Sons, New York, 1936; 7–140507–141.

*Primary Examiner*—Bernarr E. Gregory
*Attorney, Agent, or Firm*—Oblon, Spivak, McClelland, Maier & Neustadt

[57] ABSTRACT

A spectrum spreading receiver including a super-regenerative demodulator which is capable of receiving a spectrum spread signal and which is resistant to noise and has a wide band, resulting in being simplified in structure and decreased in manufacturing cost. A signal of which a spectrum is spread by a PN code is received by a receiving antenna and then demodulated by the super-regenerative demodulator. Then the same PN code as the PN code having carried out the spectrum spreading is generated and the correlation between the signal and the PN code is made by a correlation unit, resulting in the decoding of the spread signal into the original base band signal.

6 Claims, 6 Drawing Sheets

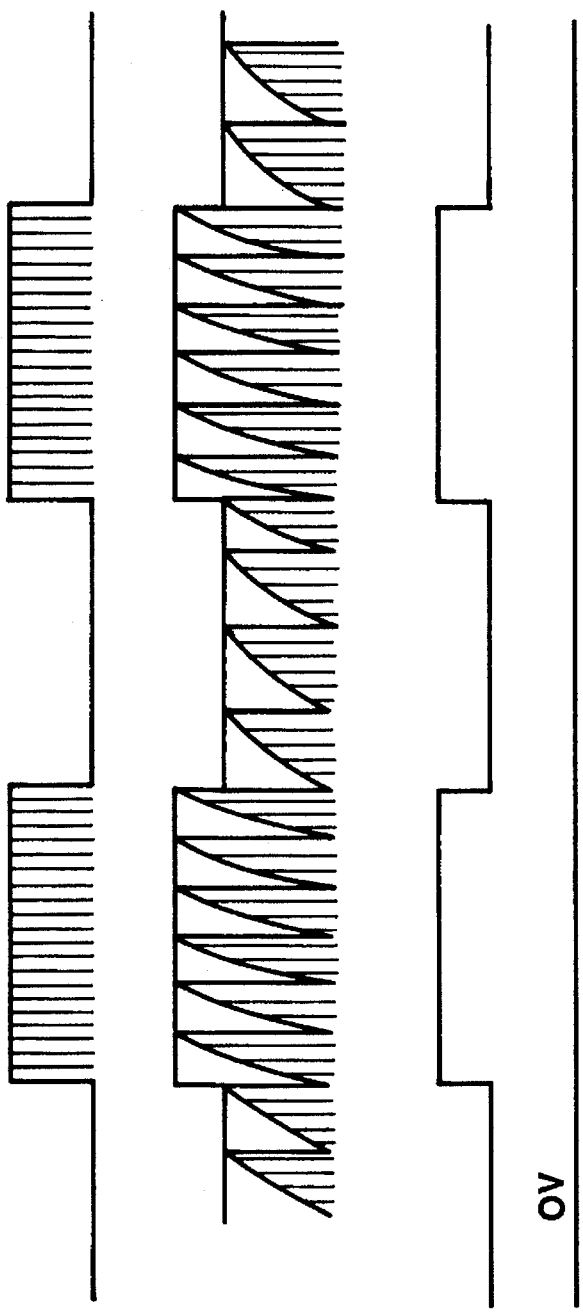

SPECTRUM SPREAD RECEIVER AND SPECTRUM SPREAD TRANSMITTER-RECEIVER INCLUDING SAME

BACKGROUND OF THE INVENTION

This invention relates to a spectrum spread transmitter-receiver adapted to transmit and receive a signal of which a frequency spectrum is spread by a pseudo noise (PN) code, and mere particularly to a spectrum spread transmitter-receiver suitable for use for a remote control device or a radio control device for remotely controlling a garage, an unmanned vehicle in a factory, a crane, illumination of an area, a cargo or the like.

In a spectrum spreading transmitter-receiver, a signal spectrum to be transmitted is spread so as to approximate a spectrum of white noise, whereas in a transmitter, it is decoded by means of correlation; thus, it is considered to be a communication means which is highly resistant to noise. Under the circumstances, it has been conventionally used as a communication means in an environment of increased noise.

Thus, in the spectrum spread transmitter-receiver, a signal is generally spread using a PN code, of which a spectrum resembles white noise, resulting in a band of a base band signal being substantially spread after it has been subjected to modulation.

The base band signal thus spread is used for modulating a carrier, which is then output in the form of a radio wave from an antenna. Subsequently, the output radio wave is received by a receiving antenna and then input to a receiver.

However, such a communication means causes a band of a signal to be substantially spread as described above even when simple information is transmitted, so that a receiver which receives the signal is complicated in structure, leading to an increase in manufacturing cost.

More particularly, as widely known in the art, when a GB product which is a product of gain and an amplifiable band is to be increased, it is necessary to provide an amplifier for this purpose.

Thus, it is also required that a receiver for receiving a signal of a wide band be provided with a specific means for increasing the GB product. Unfortunately, this likewise causes the receiver to be complicated in structure, leading to an increase in manufacturing cost.

SUMMARY OF THE INVENTION

The present invention has been made in view of the foregoing disadvantage of the prior art.

Accordingly, it is an object of the present invention to provide a spectrum spread receiver for a communication means by spectrum spreading which is simplified in structure to a level sufficient to realize a decrease in manufacturing cost.

In order to accomplish the above-described object, a super-regenerative demodulator which is known as a high sensitive demodulator of a wide band is used for a spectrum spreading transmitter-receiver, to thereby compensate for the above-described disadvantage of a spectrum spread receiver.

Thus, in accordance with one aspect of the present invention, a spectrum spreading receiver is provided. The spectrum spread receiver comprises a means for receiving a spectrum spreading transmitted signal, a super-regenerative demodulator for demodulating the received signal, to thereby provide a spectrum spread signal, and a correlation unit for multiplying the spectrum spread signal by a PN code to decode the signal into the original base band signal.

In accordance with another aspect of the present invention, a spectrum spreading transmitter-receiver is provided. The spectrum spreading transmitter-receiver comprises a spectrum spreading receiver including an encoder for multiplexing a plurality of channel signals to provide a multiplexed signal and an exclusive OR circuit for subjecting the multiplexed signal and a PN code fed thereto to spectrum spreading, the spectrum spread signal being used for modulating a carrier and then transmitted; and a spectrum spreading receiver including a means for receiving the spectrum spread signal, a super-regenerative demodulator for demodulating the received signal, a correlation unit for multiplying the spectrum spread signal by a PN code to decode the signal, and a decoder for separating the decoded signal into a plurality of channel signals.

In general, a super-regenerative demodulator exhibits high sensitivity and operates satisfactorily following a signal of a wide band while being simplified in structure. Nevertheless, it is known in the art that the super-regenerative demodulator has a disadvantage of being deteriorated in selectivity and resistance to noise. In the present invention constructed as described above, the super-regenerative demodulator thus deteriorated in selectivity or having a wide band is combined with a spectrum spreading transmitter-receiver exhibiting highly increased resistance to noise, so that advantages of both may be available over the prior art. Thus, the present invention provides a spectrum transmitter-receiver which exhibits resistance to noise and is simplified in structure.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein:

FIGS. 7(a)–7(c) are waveform diagrams each showing a signal during super-regenerative modulation.

DETAILED DESCRIPTION OF THE PREFERRED EMBODIMENTS

Now, the present invention will be described hereinafter with reference to the accompanying drawings.

Figure 1:
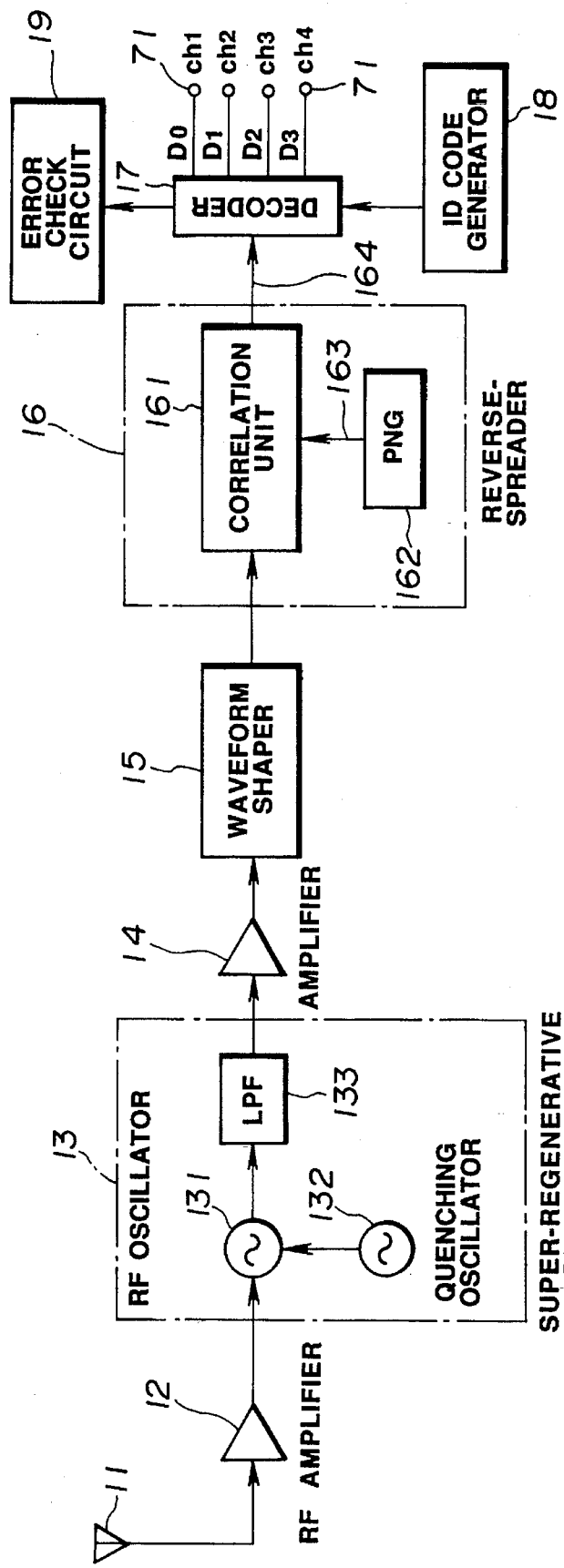
FIG. 1 is a block diagram showing an embodiment of a receiver in a spectrum spreading transmitter-receiver according to the present invention.

Referring first to FIG. 1, a receiver in a spectrum spreading transmitter-receiver according to the present invention is illustrated. The receiver of the illustrated embodiment includes a receiving antenna 11 which is adapted to receive a radio wave modulated by a spectrum spread signal. The receiver also includes a radio frequency (RF) amplifier 12 for amplifying the high frequency signal received by the receiving antenna 11 and a super-regenerative demodulator 13 for demodulating the high frequency signal thus amplified and then fed thereto.

The signal of a spread spectrum which has been subject to demodulation in the super-regenerative demodulator 13 is next subjected to amplification in an amplifier 14, and then shaped into a pulse waveform in a waveform shaper 15. The signal thus shaped into a pulse waveform is fed to a reverse-spreader 16, and is thereby decoded into the original signal prior to spectrum spreading.

The signal decoded is then fed to a decoder 17, wherein it is subject to coincidence with an ID code which is a code for identification. Then, the signal is fed to an error checking circuit 19 for checking any error of the signal.

Subsequently, the signal is subject to separation in the decoder 17. More particularly, when the signal is information of four channels, it is separated into four signals for a first channel ch1, a second channel ch2, a third channel ch3 and a fourth channel ch4, which are then output.

Now, the reasons why the RF amplifier 12 is provided will be described hereinafter.

The super-regenerative demodulator 13 arranged subsequent to the RF amplifier 12 is considered to be equivalently a functional circuit comprising a quenching oscillator 132, a high frequency oscillator 131 and a low pass filter 133 for extracting a modulated signal component.

An oscillating wave of the quenching oscillator 132 which carries out quenching oscillation is in the form of a saw tooth wave approaching a spike-like shape, resulting in having a wide frequency component. Also, an oscillating voltage of the quenching oscillator is as high as 200 to 300 mV, resulting in forming noise which disturbs other electrical devices when it is output from the antenna 11. Thus, it is preferable that one directionality of the signal is carried out in the RF amplifier 12, to thereby prevent the noise from disturbing other electrical devices.

The reason why the super-regenerative demodulator exhibits a demodulating action is not completely elucidated. However, it is elucidated that it exhibits a function of demodulating amplitude modulation (AM), frequency modulation (FM) and single sideband modulation (SSB).

The super-regenerative demodulator 13, as described above, includes the RF oscillator 131 which carries out high frequency oscillation near its central frequency in response to a signal input thereto, the quenching oscillator 132 which carries out intermittent oscillation at a low frequency, and the low pass filter 133 for removing noise.

A circuit structure of the super-regenerative demodulator and its operation are shown in FIGS. 6 and 7(a)–7(c), respectively.

Figure 6:
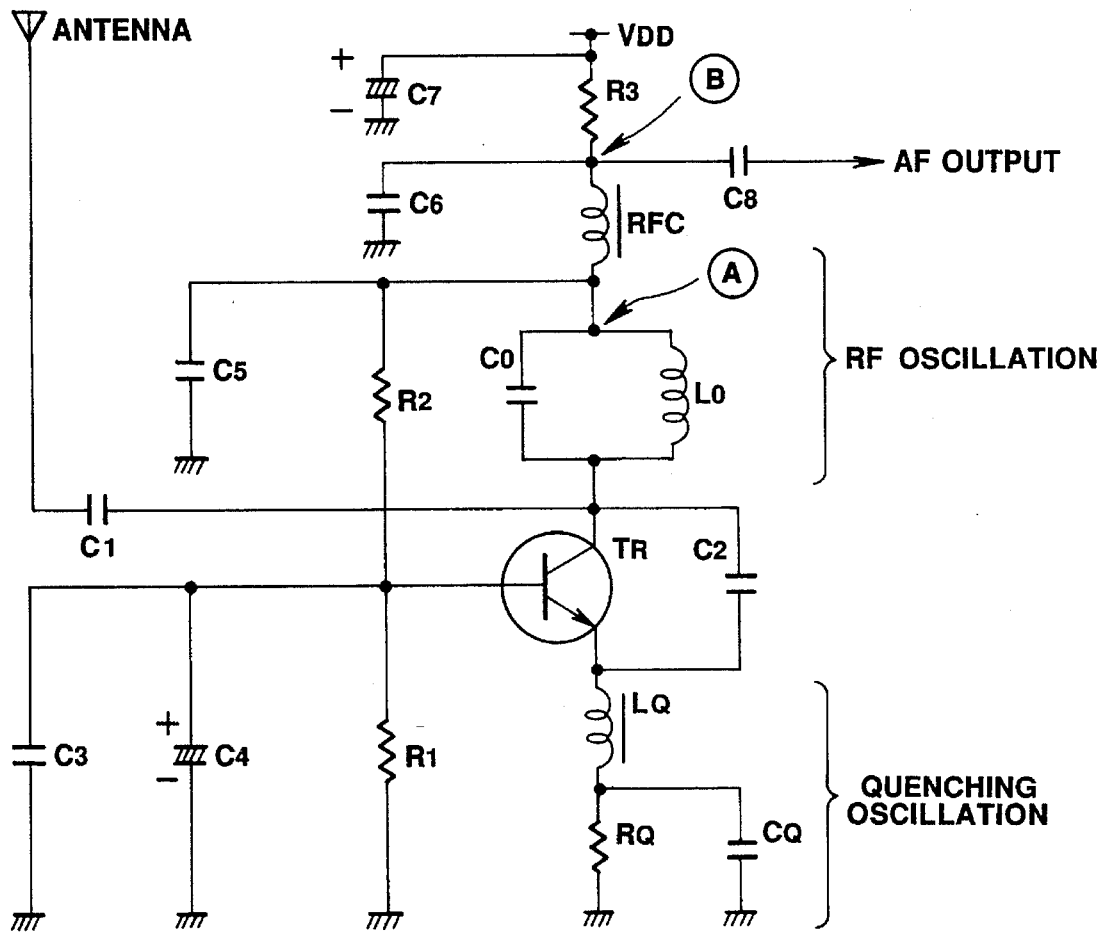
FIG. 6 is a circuit diagram showing a super-regenerative demodulator.

More specifically, as shown in FIG. 6, the quenching oscillation circuit 132 includes an inductor $L_Q$, a capacitor $C_Q$ and a resistor $R_Q$, whereas the RF oscillator 131 includes an inductor $L_O$ and a capacitor $C_O$. An oscillating signal of the RF oscillator which comprises the inductor $L_O$ and capacitor $C_O$ and carries out high frequency oscillation at a central frequency of a signal input through the antenna is subject to commencement and interruption of oscillation which are alternately repeated at a quenching frequency of the quenching oscillator 132.

Supposing that the signal input through the antenna is a burst wave as indicated in FIG. 7(a), a waveform of the signal at an output point A (FIG. 6) of a tank circuit of the RF oscillator is as indicated in FIG. 7(b), resulting in a quenching oscillation waveform like a saw tooth wave of which an envelope is an amplitude of the burst wave (FIG. 7(c)).

The reverse-spreader 16 includes a PN code generator 162 and a correlation unit 161. A PN code generated from the PN code generator 162 is the same as the PN code used on the transmitting side and constructed in the same manner as the latter.

Figure 5:
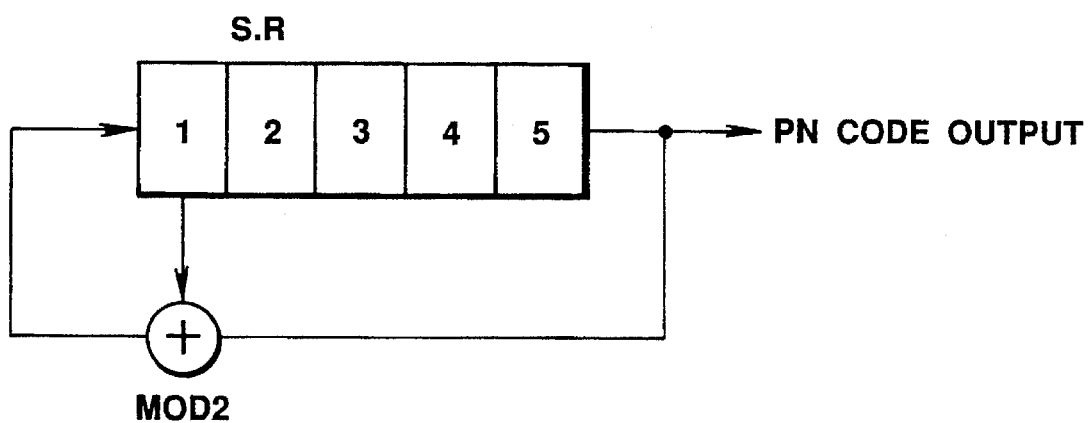
FIG. 5 is a schematic view showing an example of a PN code generator.

The PN code generator 162 may be constructed in a manner as shown in, for example, FIG. 5. The PN code generator is a so-called M series code generator and includes a five-stage shift register SR and a modulo-2-adder MOD2, resulting in generating a PN code of 15 bits in length.

Table 1 shows contents of the five-stage shift register SR Conditions 1 to 16 in time series, wherein supposing that Condition 1 is an initial condition, the contents of the shift register SR at this time are "1111".

TABLE 1

| Condition | Contents of Shift Register |
|---|---|
| 1 | 1 1 1 1 |
| 2 | 0 1 1 1 |
| 3 | 1 0 1 1 |
| 4 | 0 1 0 1 |
| 5 | 1 0 1 0 |
| 6 | 1 1 0 1 |
| 7 | 0 1 1 0 |
| 8 | 0 0 1 1 |
| 9 | 1 0 0 1 |
| 10 | 0 1 0 0 |
| 11 | 0 0 1 0 |
| 12 | 0 0 0 1 |
| 13 | 1 0 0 0 |
| 14 | 1 1 0 0 |
| 15 | 1 1 1 0 |
| 16 | 1 1 1 1 |

Under the circumstances described above, an output of the adder MOD2 is "0" because an add input at an input terminal thereof is plus and "1" and the the output "0" is then input to a first stage of the shift register SR. Therefore, in Condition 2, "0" is read in the first stage of the shift register, resulting in the contents of the shift register being "0111".

Then, the add input of the adder MOD2 is caused to be "0" plus "1", resulting in an output thereof being "1". Thus, in Condition 3, the output "1" of the adder MOD2 is read in, so that the contents of the shift register SR may be "1011".

The above-described operation is repeated, resulting in the contents of the shift registers SR in Conditions 4, 5, 6, 7, 8, 9, 10, 11, 12, 13, 14, 15 and 16 being "0101", "1010", "1101", "0110", "0011", "1001", "0100", "0010", "0001", "1000", "1100", "1110" and "1111", respectively, so that the contents of the shift register are returned to the initial condition, resulting in the cycle being fifteen. The PN code output is derived from a fifth stage of the shift register SR, to thereby be "111101011001000" which is an output at the fifth stage, resulting in being a PN code of fifteen bits wherein such a signal arrangement as described above is repeated.

The PN code thus generated from the PN code generator 162 is multiplied by an output of the waveform shaper 15 in the correlation unit 161, resulting in only a signal spread by the same PN code as the PN code generated from the PN code generator 162 being decoded on the receiving side.

Figure 4:
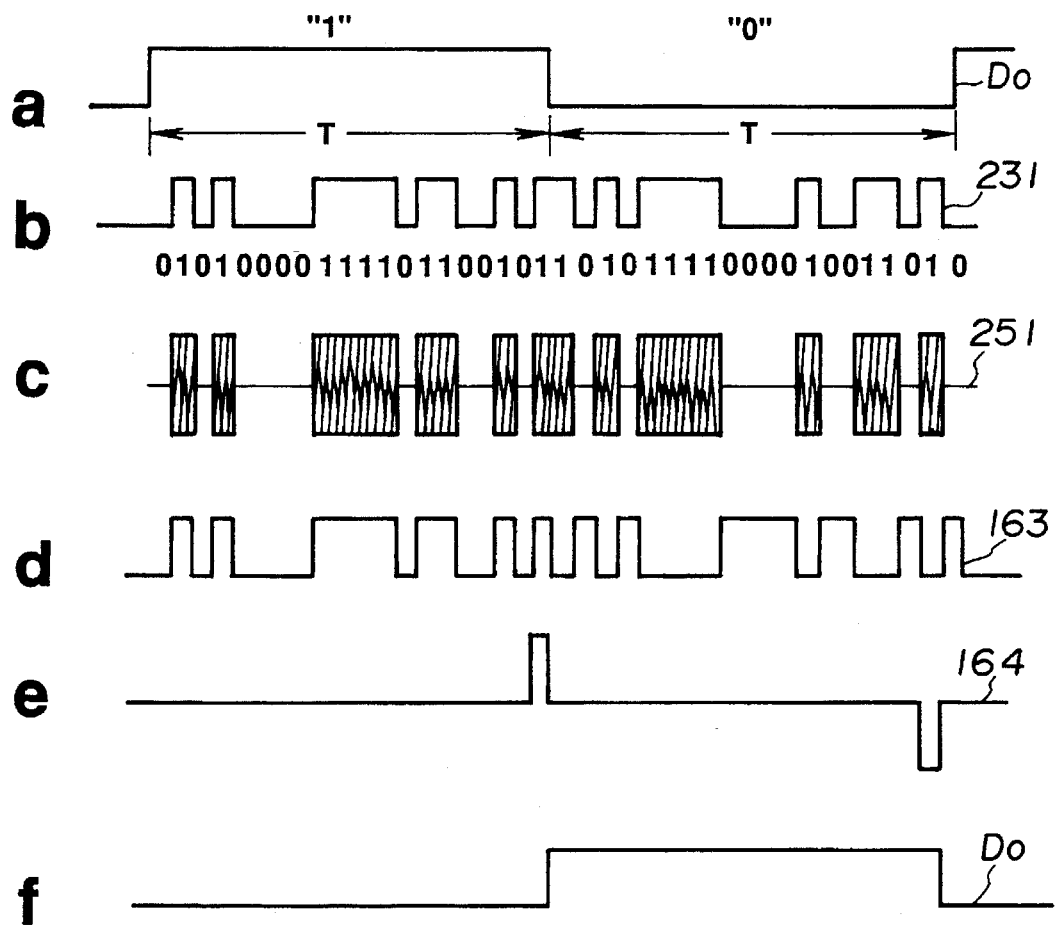
FIGS. 4 is a group of waveform diagrams each showing a signal of an essential port of a spectrum spreading transmitter-receiver according to the present invention.

Typical waveforms obtained by the receiver of the illustrated embodiment are shown in FIG. 4.

A modulated output designated at C which is obtained by subjecting a base band data a on the transmit side to ASK modulation is output from a transmitter and then received by the receiving antenna 11. The signal received is demodulated through the RF amplifier 12 and super-regenerative demodulator 13 and then shaped through the amplifier 14 and waveform shaper 15, resulting in a pulse waveform as indicated at b in FIG. 4.

Also, the PN code generated by the receiver has such a pulse waveform as indicated at d in FIG. 4. The correlation unit 161 of the reverse-spreader 16 provides an output waveform of a sharp peak indicated at e in FIG. 4, which is obtained by multiplying the pulse waveform b in FIG. 4 by the pulse waveform d in FIG. 4.

The output waveform thus obtained is then converted into the original base band data in the decoder 17.

Figure 2:
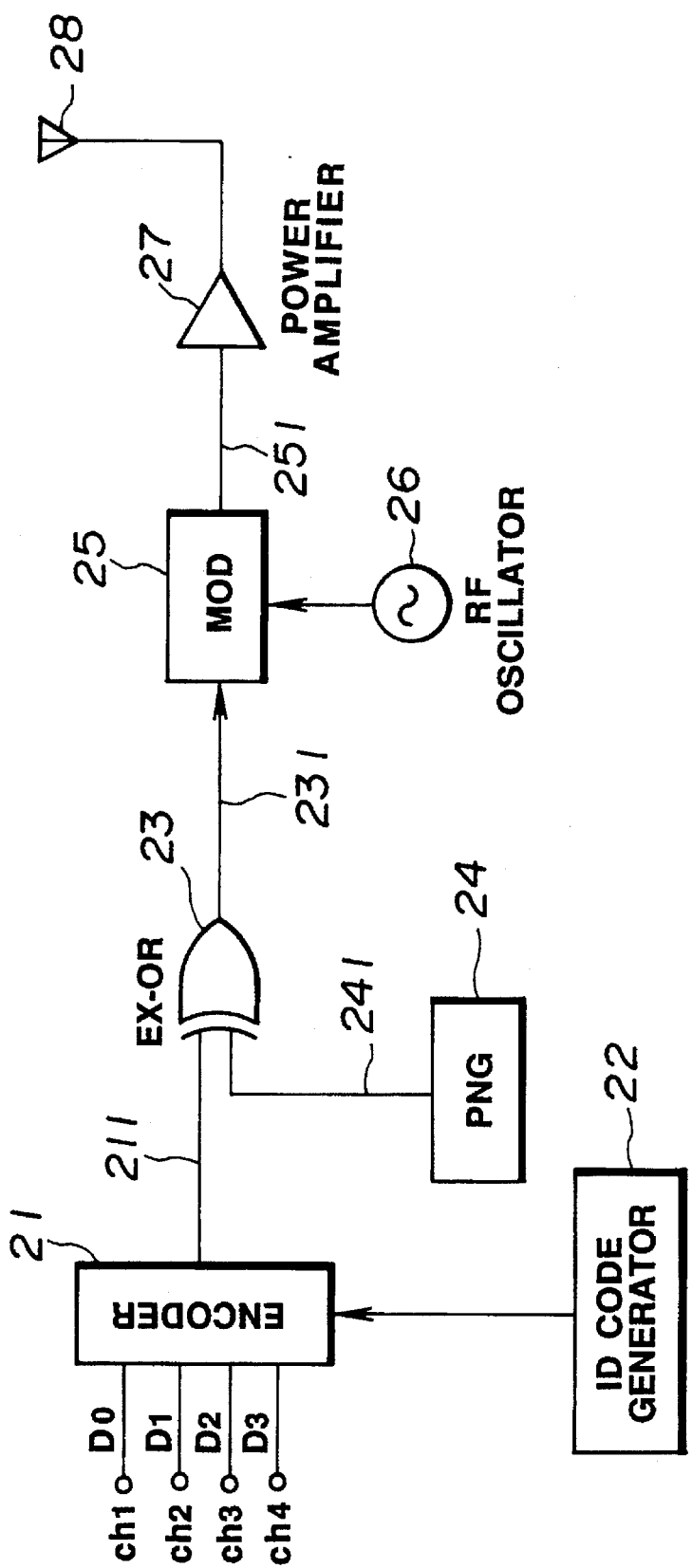
FIG. 2 is a block diagram showing an embodiment of a transmitter in a spectrum spreading transmitter-receiver according to the present invention.

Referring now to FIG. 2, an embodiment of a transmitter according to the present invention is illustrated. In a transmitter of the illustrated embodiment each of, signals $D_O$ to $D_3$ of four channels ch1 to ch4 is fed to an encoder 21, resulting in being subject to time division multiplexing. Also, in the encoder 21, an identification code generated from an ID code generator 22 is added to the signal thus subjected to time division multiplexing. Further, a synchronous code SYNC (not shown) is added to the encoder 21.

Figure 3:
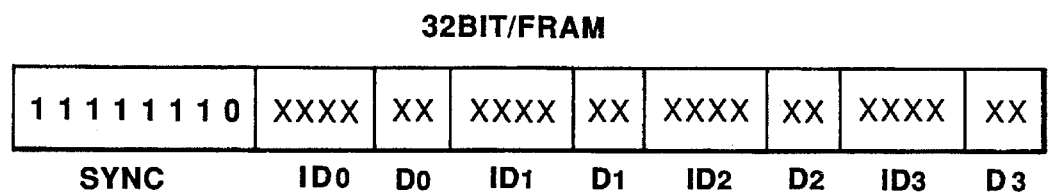
FIG. 3 is a schematic view showing a frame data.

An example of frame which are data generated from the encoder 21 is shown in FIG. 3. The data are constructed on the assumption that data of each of the channels ch1 to ch4 are constructed into a two-bit structure.

As shown in FIG. 3, one frame of data is constructed of thirty-two bits. First eight bits of each of the frame data are a synchronous code SYNC, which may be, for example, "11111110". The synchronous code is constructed of seven successive "1" bits which are not generated by a combination of the data and identification code.

The next four bits are a first code $ID_O$ of an identification code divided into four parts and the subsequent two bits are a data signal $D_O$ of the channel ch1, followed by a second divided identification code $ID_1$ of four bits, a data signal $D_1$ of two bits of the channel ch2, a third divided identification code $ID_2$ of four bits, a data signal $D_3$ of two bits of the channel ch3, a last divided identification code $ID_3$ of four bits and a data signal $D_4$ of two bits of the channel ch4.

The frame data 211 thus constructed are output from the encoder 21 and then input to one of input terminals of an exclusive OR circuit 23. To the other input terminal of the exclusive OR circuit 23 is added a PN code 241 generated by a PN code generator 24.

The exclusive OR circuit 23 constitutes a spectrum spreader, of which an output 231 has such a waveform as indicated at b in FIG. 4.

As will be noted from the data arrangement as described above, when the data are "1", the PN code is output as it is; whereas when the data are "0", the PN code is inverted, so that a spectrum thereof is spread, leading to an output 231.

The spectrum spread output 231 causes a carrier signal of a high frequency oscillator 26 to be subject to ASK modulation in a modulator 25, resulting in a signal 251. The signal 251 thus subjected to ASK modulation has a waveform as indicated at c in FIG. 4.

The signal 251 is then subject to power amplification in a power amplifier 27 and then output in the form of a radio wave from a transmitting antenna 28.

The above description has been made on the embodiments for realizing the spectrum spread transmitter-receiver of the present invention. However, the present invention is not limited to the circuit structures described above and may be modified in various ways. For example, the PN code generator, decoder, encoder and the like each may comprise an IC circuit of a single chip on the side of the transmitter or receiver, to thereby permit the communication device to be down-sized.

Also, the present invention may be constructed in such a manner that a carrier is automatically fed for a predetermined period of time on the receiving side simultaneous with turning-on of the power switch and the power switch is caused to be turned on when a signal is not fed for a predetermined period of time. Such construction leads to power savings.

As can be seen from the foregoing, the present invention is constructed so as to permit disadvantages of the spectrum spreading communication system and super-regenerative demodulation system to compensate for each other, so that an equipment which exhibits resistance to noise sufficient to permit it to be used for spectrum spreading communications of high sensitivity may be provided while being simplified in construction and reduced in manufacturing cost.

Application of such an equipment improved in performance and reduced in manufacturing cost to an industrial remote control device such as a remote control device for a garage, a door, an unmanned vehicle in a factory, a key-less entry system such as a crane, or the like permits it to exhibit an increased advantage.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A spectrum spread receiver comprising:

a means for receiving a spectrum spread transmitted signal;

a super-regenerative demodulator for demodulating the received signal, to thereby produce a spectrum spread signal; and a correlation unit for multiplying the spectrum spread signal by a PN code to decode the signal, to thereby produce the original base band signal; and a decoder receiving as an input the signal decoded in said correlation unit, wherein said decoder separates the decoded signal into a plurality of channel signals and said decoder provides error checking.

2. A spectrum spreading receiver as defined in claim 1 wherein said decoder carries out detection of coincidence of said signal with an identification code.

3. A spectrum spreading transceiver comprising:

a spectrum spreading transmitter for transmitting a carrier signal including an encoder for multiplexing a plurality of signals to produce a multiplexed signal, a modulator for modulating said carrier signal and an exclusive OR circuit for subjecting the multiplexed signal and a PN code fed thereto to spectrum spreading, in order to produce a spectrum spread signal for modulating said carrier signal to be transmitted; and a spectrum spreading receiver including a means for receiving the spectrum spread signal, a super-regenerative demodulator for demodulating the received signal, a correlation unit for multiplying the spectrum spread signal by a PN code to decode the signal, and a decoder for separating the decoded signal into a plurality of channel signals.

4. The spectrum spreading transceiver as defined in claim 3, wherein said encoder carries out addition of an identification code and said decoder detects coincidence of said signal with the identification code.

5. A spectrum spreading transceiver as defined in claim 3 or 4, wherein said decoder carries out error checking.

6. A spectrum spreading receiver, comprising:

a receiving antenna for receiving a radio wave signal which has been spectrum spread and modulated in a transmitter;

a super regenerative modulator including radio-frequency and quenching oscillators for demodulating the signals received by said receiving antenna; and a reverse spreading circuit which includes a correlation unit and a pseudo-noise code generator for decoding the signals output by said super regenerative demodulator so as to produce the radio wave signal prior to spectrum spreading;

a waveform shaper for converting the spectrum spread signal into a pulse waveform;

a decoder for identifying the signal output by said reverse spreading circuit; and an error checking circuit for checking the signal output by said reverse spreading circuit for errors.

* * * * *